(12) United States Patent
Tiller et al.

(10) Patent No.: US 8,426,011 B2
(45) Date of Patent: *Apr. 23, 2013

(54) MARKING BASED ON CHIRAL LIQUID CRYSTAL POLYMERS

(75) Inventors: Thomas Tiller, Bussigny (CH); Frédéric Gremaud, Epagny (CH); Andrea Callegari, Chavannes-près-Renens (CH)

(73) Assignee: SICPA Holding SA, Prilly (CH)

( * ) Notice: Subject to any disclaimer, the term of this patent is extended or adjusted under 35 U.S.C. 154(b) by 354 days.

This patent is subject to a terminal disclaimer.

(21) Appl. No.: 12/783,068

(22) Filed: May 19, 2010

(65) Prior Publication Data

US 2011/0135889 A1 Jun. 9, 2011

Related U.S. Application Data

(60) Provisional application No. 61/267,673, filed on Dec. 8, 2009.

(51) Int. Cl.
*B41M 5/28* (2006.01)
*B41M 3/14* (2006.01)
*B42D 15/10* (2006.01)
*C09K 19/38* (2006.01)
*C09K 19/54* (2006.01)
*G06K 7/10* (2006.01)
*B41J 2/00* (2006.01)

(52) U.S. Cl.
USPC .... 428/195.1; 428/1.6; 428/199; 252/299.01; 252/299.5; 283/72; 283/74; 427/7; 347/110; 235/454; 235/462.01

(58) Field of Classification Search .......... 428/1.6, 428/195.1, 199; 252/299.01, 299.5; 283/72, 283/74; 235/454, 462.01; 347/110; 427/7
See application file for complete search history.

(56) References Cited

U.S. PATENT DOCUMENTS

| | | | |
|---|---|---|---|
| 6,207,240 | B1 | 3/2001 | Schoenfeld et al. |
| 7,540,421 | B2 | 6/2009 | Pinchen et al. |
| 2003/0052305 | A1 | 3/2003 | Coates et al. |
| 2006/0257633 | A1 | 11/2006 | Inoue et al. |
| 2007/0200001 | A1 | 8/2007 | Pinchen et al. |
| 2007/0224341 | A1 | 9/2007 | Kuntz et al. |
| 2009/0174914 | A1 | 7/2009 | Pinchen et al. |
| 2011/0133445 | A1* | 6/2011 | Tiller et al. ............ 283/74 |
| 2011/0135853 | A1* | 6/2011 | Tiller et al. ............ 428/29 |
| 2011/0135890 | A1* | 6/2011 | Tiller et al. ............ 428/195.1 |

FOREIGN PATENT DOCUMENTS

| | | |
|---|---|---|
| GB | 2457911 A | 9/2009 |
| JP | 2009-300662 A | 12/2009 |
| WO | 2005/049703 A | 6/2005 |
| WO | 2006/118889 A | 11/2006 |
| WO | 2009/121605 A | 10/2009 |

OTHER PUBLICATIONS

M. Barón, *Pure Appl. Chem.*, 2001, vol. 73, No. 5, pp. 845-895.
English language translation of JP 2009-300662.

* cited by examiner

*Primary Examiner* — Shean C Wu
(74) *Attorney, Agent, or Firm* — Greenblum and Bernstein, P.L.C.

(57) ABSTRACT

A liquid crystal polymer marking is obtainable by a process that comprises applying a chiral liquid crystal precursor composition onto a substrate, heating the composition to a bring same to a chiral liquid crystal state, locally applying at least one modifying agent to modify the chiral liquid crystal state, and curing and/or polymerization the resultant product. This abstract is neither intended to define the invention disclosed in this specification nor intended to limit the scope of the invention in any way.

36 Claims, 1 Drawing Sheet

MARKING BASED ON CHIRAL LIQUID CRYSTAL POLYMERS

CROSS-REFERENCE TO RELATED APPLICATIONS

The present application claims the benefit under 35 U.S.C. §119(e) of U.S. Provisional Application No. 61/267,673, filed Dec. 8, 2009, the entire disclosure of which is expressly incorporated by reference herein.

BACKGROUND OF THE INVENTION

1. Field of the Invention

The present invention relates to a marking based on chiral nematic (also called cholesteric) liquid crystal polymers. The invention also relates to a method for the modification of chiral nematic liquid-crystal films, in which a chiral nematic liquid-crystal layer is locally or selectively (one or more region(s)) modified with the aid of a modifying agent.

2. Discussion of Background Information

Counterfeiting and market diversion of mass produced goods are facilitated if the products are handled on a lot base rather than on an individual item base. In such case counterfeit or diverted products are easily introduced into the supply chain. Producers and retailers would like to be in a position to distinguish their original products from such counterfeit or diverted (parallel imported or smuggled) products at the level of the individual unit that is sold.

In an attempt to prevent counterfeiting marking is currently used extensively; for example, "optically variable" features which exhibits viewing-angle dependent color, have been proposed in the art as authentication means. Among these are holograms (cf. Rudolf L. van Renesse, "Optical Document Security" 2nd ed., 1998, the entire disclosure whereof is incorporated by reference herein, chapter 10) and optical thin film security devices (idem, chapter 13).

Another type of marking in an attempt to prevent counterfeiting is a cholesteric liquid crystal, which exhibits viewing-angle dependent color. When illuminated with white light the cholesteric liquid crystal structure reflects light of a predetermined color (predetermined wavelength range) which is a function of the employed materials and generally varies with the angle of observation and the device temperature. The precursor material itself is colorless and the observed color (predetermined wavelength range) is only due to a physical reflection effect at the cholesteric helical structure adopted at a given temperature by the liquid crystal material (cf. J. L. Fergason, Molecular Crystals, Vol. 1, pp. 293-307 (1966), the entire disclosure whereof is incorporated by reference herein). In particular, in liquid crystal materials (cholesteric liquid crystal polymers (CLCPs)) the cholesteric helical structure is "frozen" in a predetermined state through polymerization and thus rendered temperature-independent.

The chiral nematic liquid crystal phase is typically composed of nematic mesogenic molecules which comprise a chiral dopant that produces intermolecular forces that favor alignment between molecules at a slight angle to one another. The result thereof is the formation of a structure which can be visualized as a stack of very thin 2-D nematic-like layers with the director in each layer twisted with respect to those above and below. An important characteristic of the chiral nematic liquid crystal phase is the pitch p (see FIG. 1). The pitch p is defined as the (vertical) distance it takes for the director to rotate one full turn in the helix.

A characteristic property of the helical structure of the chiral nematic phase is its ability to selectively reflect light whose wavelength falls within a specific range. When this range overlaps with a portion of the visible spectrum a colored reflection will be perceived by an observer. The center of the range is approximately equal to the pitch multiplied by the average refractive index of the material. One parameter which has an influence on the pitch is the temperature because of the dependence thereon of the gradual change in director orientation between successive layers which modifies the pitch length, resulting in an alteration of the wavelength of reflected light as a function of the temperature. The angle at which the director changes can be made larger, thereby tightening the pitch, by increasing the temperature of the molecules, hence giving them more thermal energy. Similarly, decreasing the temperature of the molecules increases the pitch length of the chiral nematic liquid crystal. Other definitions of liquid crystal polymers and liquid crystal phases can be found in M. Barón, Pure Appl. Chem., 2001, Vol. 73, No. 5, pp. 845-895, the entire disclosure of which is incorporated by reference herein.

In order to enhance the level of security of a chiral liquid crystal polymer film a first idea which could come to mind is to superpose a code in the form of a pattern, indicia or a bar code on the liquid crystal polymer film. However, there is always a risk that a counterfeiter tampers with the code and manually applies it onto the liquid crystal polymer film.

A second possibility to overcome this problem is to insert directly the code inside the liquid crystal polymer film. For example, U.S. Pat. No. 6,207,240, the entire disclosure whereof is incorporated by reference herein, describes an effect coating of a cholesteric liquid crystal polymer (CLCP) with viewing angle dependent reflection color, which further comprises absorption type pigments exhibiting a specific absorption color. A marking, such as a symbol or a text, is generated in the CLCP coating by laser irradiation. The laser radiation carbonizes the CLCP material in the irradiated area. As a result, the color of the substrate on which the CLCP is coated, or the color of absorption pigments incorporated into the CLCP, becomes visible in the irradiated area. However, the method requires high-power lasers to carbonize the material such that the markings are visible.

Another possibility is described in US 2006/0257633A1, the entire disclosure of which is incorporated by reference herein, which is applied not only to liquid crystal polymers but to polymers in general. The method consists of applying a permeating substance to a predetermined region on the surface of the polymer substrate and bringing a supercritical fluid into contact with the surface of the polymer substrate to which the permeating substance has been applied to cause the permeating substance to permeate into the polymer substrate. The method makes it possible to selectively (partially) modify a portion of the surface of the polymer. However, for industrial processes where a high marking speed for a large number of items is required the method is complex and expensive to implement.

SUMMARY OF THE INVENTION

The present invention provides a liquid crystal polymer marking. The marking is obtainable by a process which comprises:
  (i) applying a chiral liquid crystal precursor composition onto at least one surface of a (solid) substrate;
  (ii) heating the applied composition to bring same to a chiral liquid crystal state;
  (iii) applying to at least one area (region) of the applied composition at least one modifying agent to modify the chiral liquid crystal state locally in the at least one area;

(iv) curing and/or polymerizing the (entire) composition to convert the composition in the locally modified chiral liquid crystal state into a liquid crystal polymer marking.

In one aspect of the marking of the present invention, the at least one modifying agent may at least partially convert the chiral liquid crystal state into an isotropic state.

In another aspect, the chiral liquid crystal precursor composition may comprise (i) one or more (e.g. two, three, four, five or more and in particular, at least two) different nematic compounds A and (ii) one or more (e.g., two, three, four, five or more) different chiral dopant compounds B which are capable of giving rise to a cholesteric state of the chiral liquid crystal precursor composition upon heating. Further, both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, a (preferably activated) unsaturated carbon-carbon bond such as, e.g., a group of formula $H_2C=CH-C(O)-$.

In yet another aspect of the marking of the present invention, the chiral liquid crystal precursor composition may comprise at least one chiral dopant compound B of formula (I):

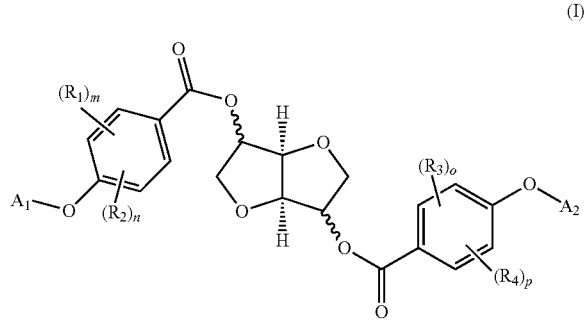

(I)

wherein:

$R_1, R_2, R_3, R_4, R_5, R_6, R_7$ and $R_8$ each independently denote $C_1$-$C_6$ alkyl and $C_1$-$C_6$ alkoxy;

$A_1$ and $A_2$ each independently denote a group of formula (i) to (iii):

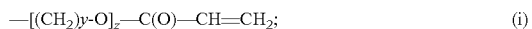  (i)

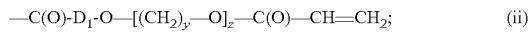  (ii)

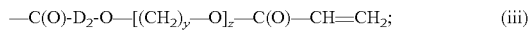  (iii)

$D_1$ denotes a group of formula

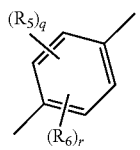

$D_2$ denotes a group of formula

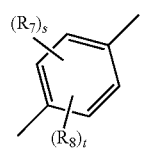

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In a still further aspect of the marking of the present invention, the at least one modifying agent may comprise at least one compound that is selected from ketones having from 3 to about 6 carbon atoms (e.g., 3, 4, 5 or 6 carbon atoms), alkyl esters and dialkylamides of carboxylic acids which comprise a total of from 2 to about 6 carbon atoms (e.g., 2, 3, 4, 5 or 6 carbon atoms), dialkyl sulfoxides comprising a total of from 2 to about 4 carbon atoms (e.g., 2, 3 or 4 carbon atoms), and optionally substituted nitrobenzene. For example, the at least one modifying agent may comprise at least one of dimethyl ketone, methyl ethyl ketone, ethyl acetate, dimethyl formamide, dimethyl sulfoxide, and nitrobenzene.

In another aspect of the instant marking, the modifying agent may further comprise at least one resin and/or at least one salt and/or at least one pigment and/or dye that absorbs in the visible or invisible region of the electromagnetic spectrum and/or at least one luminescent pigment and/or dye.

In another aspect of the marking of the present invention, stage (ii) of the process may comprise a heating of the applied composition to a temperature of from about 55° C. to about 150° C., e.g., from about 55° C. to about 100° C., or from about 60° C. to about 100° C.

In a still further aspect, stage (iii) of the process may comprise an application (e.g., deposition) of the at least one modifying agent by continuous ink-jet printing and/or drop-on-demand ink-jet printing and/or spray coating and/or valve jet printing.

In another aspect, immediately after stage (iii) of the process a stream of air may be passed over the surface of the at least one area, preferably (substantially) parallel thereto.

In yet another aspect, the marking of the present invention may be in the form of at least one of an image, a picture, a logo, indicia, or a pattern representing a code selected from one or more of 1-dimensional barcodes, stacked 1-dimensional barcodes, 2-dimensional barcodes, 3-dimensional barcodes, and a data matrix.

The present invention also provides a substrate which comprises (e.g., carries on a surface thereof) the marking of the present invention as set forth above, including the various aspects thereof.

In one aspect of the substrate, the marking may serve as at least one of a security element, an authenticity element, an identification element, and a tracking and tracing element.

In another aspect, the substrate may be, or comprise, at least one of an identity document, a label, packaging, a banknote, a security document, a passport, a stamp, an ink-transfer film, and a reflective film.

The present invention also provides a security ink that comprises (i) one or more nematic compounds A and (ii) one or more chiral dopant compounds B which are capable of giving rise to a cholesteric state of the security ink upon application of heat thereto.

In one aspect, the security ink may comprise at least one chiral dopant compound B of formula (I) as set forth above.

The present invention also provides a method of providing a substrate with a liquid crystal polymer marking. The method comprises:
(i) applying a chiral liquid crystal precursor composition onto at least one surface of a (solid) substrate;
(ii) heating the applied composition to bring same to a chiral liquid crystal state;
(iii) applying to at least one area (region) of the applied composition at least one modifying agent to modify the chiral liquid crystal state locally in the at least one area;
(iv) curing and/or polymerizing the (entire) composition to convert the composition in the locally modified chiral liquid crystal state into a liquid crystal polymer marking.

The present invention also provides a substrate which comprises a marking (e.g., on at least one (outer) surface thereof). The marking comprises a layer or film of a chiral liquid crystal polymer. The layer or film comprises in at least one area (region) thereof a liquid crystal polymer that has at least one optical property which is different from an optical property of the remainder of the layer or film.

In one aspect of the substrate, the liquid crystal polymer in the at least one area of the layer or film may comprise (e.g., may be in) an isotropic state.

BRIEF DESCRIPTION OF THE DRAWINGS

The present invention is further described in the detailed description which follows, in reference to the plurality of drawings by way of non-limiting examples of exemplary embodiments of the present invention, and wherein.

DETAILED DESCRIPTION OF THE PRESENT INVENTION

Figure 1:
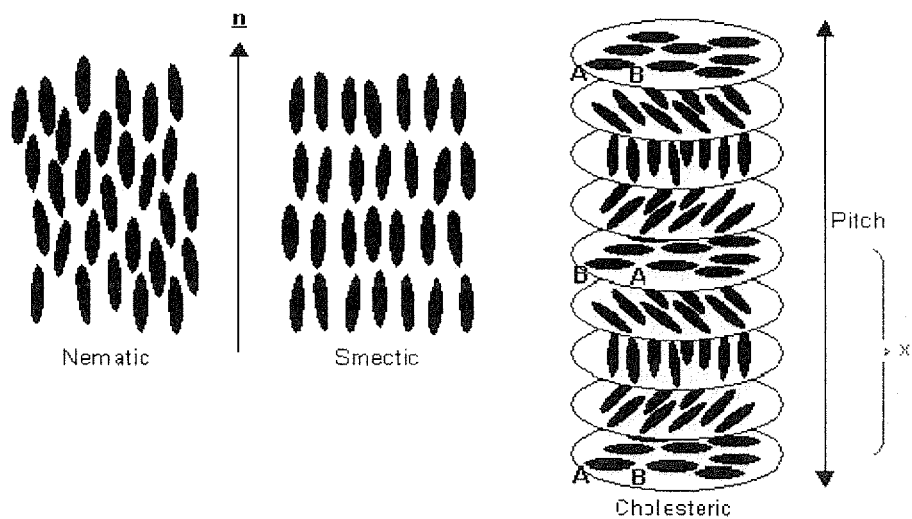
FIG. 1 is a schematic drawing which illustrates nematic, smectic and cholesteric liquid crystals.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The substrate for use in the present invention is not particularly limited and can be of various types. The substrate may, for example, consist (essentially) of or comprise one or more of a metal (for example, in the form of a container such as a can for holding various items such as, e.g., beverages or foodstuffs), optical fibers, a woven, a coating, and equivalents thereof, a plastic material, glass (for example, in the form of a container such as a bottle for holding various items such as, e.g., beverages or foodstuffs), cardboard, packaging, paper, and a polymeric material. It is pointed out that these substrate materials are given exclusively for exemplifying purposes, without restricting the scope of the invention. The substrate will preferably have a limited porosity (and may, for example, be substantially non-porous).

The substrate further will advantageously have a dark or black surface or background onto which the precursor composition is to be applied. Without wishing to be bound by any theory, it is speculated that in the case of a dark or black background the light transmitted by the cholesteric liquid crystal material is largely absorbed by the background, whereby any residual backscattering from the background does not disturb the perception of the cholesteric liquid crystal material's own reflection with the unaided eye. In contrast, on a substrate with a light or white surface or background the reflection color of the cholesteric liquid crystal material is less visible when compared with a black or dark background, due to the strong backscattering from the background. However, even in the case of a light or white background a cholesteric liquid crystal material can always be identified with the help of a circular polarization filter because it selectively reflects only one of the two possible circular polarized light components, in accordance with its chiral helical structure.

Non-limiting examples of suitable substrates include: cardboard darkened with black gravure ink (no overprinted varnish); cardboard darkened with black offset ink (no overprinted varnish); cardboard darkened with any black ink and overprinted with water based varnish; cardboard darkened with any black ink and overprinted with solvent varnish; metal treated with black coating. In general, any (preferably non-porous and preferably black) substrate (which may not necessarily be flat and may be uneven) whose coating is not soluble, or only slightly soluble, in the solvent(s) used in the chiral liquid precursor composition and in the modifying agent is a suitable substrate for the purposes of the present invention.

The chiral liquid crystal precursor composition that is used for making the marking according to the present invention and is applied (e.g., deposited) onto at least a part of at least one surface of the substrate comprises a mixture of (i) one or more nematic compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be about five to about twenty times the (total) concentration of the one or more cholesteric compounds B. Generally, a precursor composition with a high concentration of cholesteric compounds is not desirable (although possible in many cases) because the one or more cholesteric compounds tend to crystallize, thereby making it impossible to obtain the desired liquid crystal state having specific optical properties.

Nematic compounds A which are suitable for use in the chiral liquid crystal precursor composition are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1 and JP 2009-300662 A. The entire disclosures of these documents are incorporated by reference herein.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (iii) which are indicated above as meanings for $A_1$ and $A_2$ in formula (I) (and formulae (IA) and (IB)), typically bonded to optionally substituted phenyl groups. Specific non-limiting examples of nematic compounds which are suitable for use in the present invention are given below in the Example.

It is preferred for the one or more nematic compounds A (and also the one or more chiral dopant compounds B) for use in the present invention to be substantially free of compounds which do not comprise any polymerizable group (i.e., to preferably comprise compounds without any polymerizable group merely as impurities, if at all). It also is preferred for the nematic compounds to be different from cellulose derivatives.

The one or more cholesteric (i.e., chiral dopant) compounds B for use in the present invention preferably comprise at least one polymerizable group.

As set forth above, suitable examples of the one or more chiral dopant compounds B include those of formula (I):

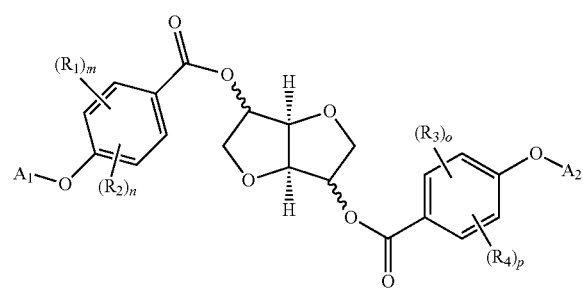

(I)

wherein:

$R_1, R_2, R_3, R_4, R_5, R_6, R_7$ and $R_8$ each independently denote $C_1$-$C_6$ alkyl and $C_1$-$C_6$ alkoxy;

$A_1$ and $A_2$ each independently denote a group of formula (i) to (iii):

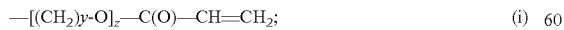  (i)

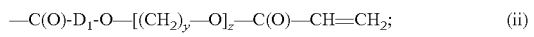  (ii)

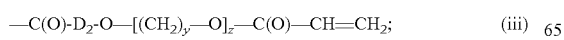  (iii)

$D_1$ denotes a group of formula

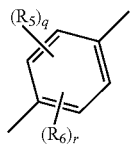

$D_2$ denotes a group of formula

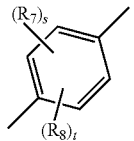

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one aspect, the one or more chiral dopant compounds B may comprise one or more isomannide derivatives of formula (IA):

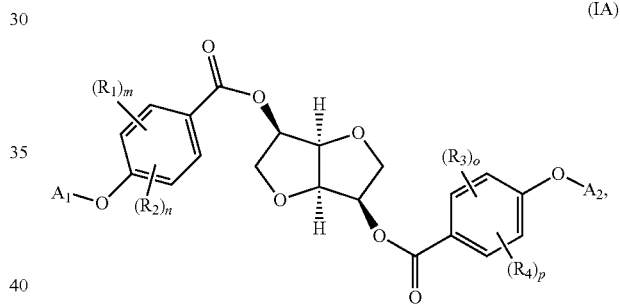

(IA)

wherein:

$R_1, R_2, R_3, R_4, R_5, R_6, R_7$ and $R_8$ each independently denote $C_3$-$C_6$ alkyl and $C_1$-$C_6$ alkoxy;

$A_1$ and $A_2$ each independently denote a group of formula (i) to (iii):

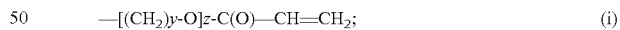  (i)

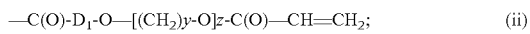  (ii)

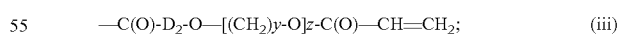  (iii)

$D_1$ denotes a group of formula

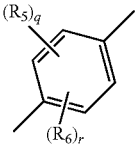

$D_2$ denotes a group of formula

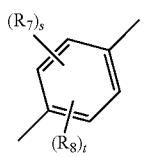

m, n, o, p, q, r, s, and t each independently denote 0, 1, or 2; y denotes 0, 1, 2, 3, 4, 5, or 6; z equals 0 if y equals 0 and z equals 1 if y equals 1 to 6.

In one embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another embodiment of the compounds of formula (I) and of formula (IA), $A_1$ and $A_2$ each independently denote a group of formula $-[(CH_2)_y-O]_z-C(O)-CH=CH_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula $-[(CH_2)_y-O]_z-C(O)-CH=CH_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula $-C(O)-D_1-O-[(CH_2)_y-O]_z-C(O)-CH=CH_2$ and/or of formula $-C(O)-D_2-O-[(CH_2)_y-O]_z-C(O)-CH=CH_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula $-C(O)-D_1-O-[(CH_2)_y-O]_z-C(O)-CH=CH_2$ and/or a group of formula $-C(O)-D_2-O-[(CH_2)_y-O]_z-C(O)-CH=CH_2$; and $R_1$, $R_2$, $R_3$, $R_4$, $R_5$, $R_6$, $R_7$ and $R_8$ each independently denote $C_1$-$C_6$ alkoxy.

In another aspect, the one or more chiral dopant compounds B may comprise one or more isosorbide derivatives represented by formula (IB):

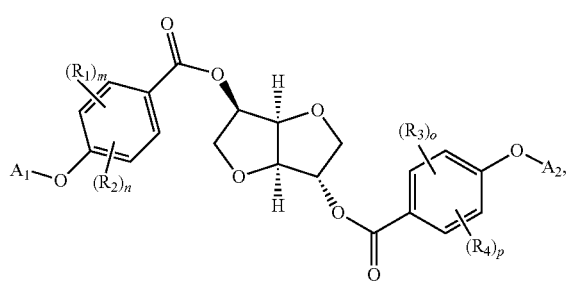

(IB)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

$-[(CH_2)_y-O]_z-C(O)-CH=CH_2$;  (i)

$-C(O)-D_1-O-[(CH_2)_y-O]_z-C(O)-CH=CH_2$;  (ii)

$-C(O)-D_2-O-[(CH_2)_y-O]_z-C(O)-CH=CH_2$;  (iii)

$D_1$ denotes a group of formula

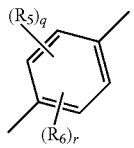

$D_2$ denotes a group of formula

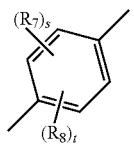

m, n, o, p, q, r, s, and t each independently denote 0, 1, or 2; y denotes 0, 1, 2, 3, 4, 5, or 6; z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IB) each independently denote $C_1$-$C_6$ alkoxy.

In another embodiment of the compounds of formula (IB), $A_1$ and $A_2$ each independently denote a group of formula $-[(CH_2)_y-O]_z-C(O)-CH=CH_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (IB) each independently denote a group of formula $-[(CH_2)_y-O]_z-C(O)-CH=CH_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula $-C(O)-D_1-O-[(CH_2)_y-O]_z-C(O)-CH=CH_2$ and/or of formula $-C(O)-D_2-O-[(CH_2)_y-O]_z-C(O)-CH=CH_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IB) each independently denote a group of formula $-C(O)-D_1-O-[(CH_2)_y-O]_z-C(O)-CH=CH_2$ and/or a group of formula $-C(O)-D_2-O-[(CH_2)_y-O]_z-C(O)-CH=CH_2$; and $R_1$, $R_2$, $R_3$, $R_4$, $R_5$, $R_6$, $R_7$ and $R_8$ each independently denote $C_1$-$C_6$ alkoxy.

In a preferred embodiment, the alkyl and alkoxy groups of $R_1$, $R_2$, $R_3$, $R_4$, $R_5$, $R_6$, $R_7$ and $R_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-3-oxy, 2,2-dimethylpent-4-oxy, 4,4-dimethylpent-1-oxy, 2,3-dimethylpent-1-oxy, 2,3- dimethylpent-2-oxy, 2,3-dimethylpent-3-oxy, 2,3-dimethylpent-4-oxy, and 3,4-dimethylpent-1-oxy.

Non-limiting specific examples of chiral dopant compounds B of formula (I) for use in the present invention are provided in the Example below.

The one or more chiral dopant compounds B will usually be present in a total concentration of from about 0.1% to about 30% by weight, e.g., from about 0.1% to about 25%, or from about 0.1% to about 20% by weight, based on the total weight of the composition. The best results will often be obtained with concentrations of from 3% to 10% by weight, e.g., from 5% to 8% by weight, based on the total weight of the precursor composition. The one or more nematic compounds A will often be present in a concentration of from about 30% to about 50% by weight, based on the total weight of the precursor composition.

In the marking according to the present invention the application (e.g., deposition) of the precursor composition is preferably carried out with a printing technique, and in particular, a printing technique selected from at least one of continuous ink-jet printing, drop-on-demand ink jet printing, and spray coating. Of course, other printing techniques known by those skilled in the art of printing may be used as well. In a preferred embodiment ink jet printing is employed. The industrial ink-jet printers, commonly used for numbering, coding and marking applications on conditioning lines and printing presses, are particularly suitable. Preferred ink jet printers include single nozzle continuous ink-jet printers (also called raster or multi level deflected printers) and drop-on-demand ink-jet printers, in particular valve-jet printers. The thickness of the applied precursor composition will usually be from about 3 to about 20 µm, e.g., from about 5 to about 15 µm.

In particular if the precursor composition is to be applied by the printing techniques set forth above, for example, by ink jet printing, the composition will usually comprise a solvent to adjust its viscosity to a value which is suitable for the employed application (printing) technique. Typical viscosity values for ink-jet printing inks are in the range of from about 4 to about 30 mPa·s at 25° C. Suitable solvents are known to those of skill in the art. Non-limiting examples thereof include low-viscosity, slightly polar and aprotic organic solvents, such as, e.g., methyl ethyl ketone (MEK), acetone, ethyl acetate, ethyl 3-ethoxypropionate, toluene and mixtures of two or more thereof.

Further, in particular if the precursor composition is to be applied by continuous ink-jet printing, the precursor composition for use in the present invention will usually also comprise at least one conductivity agent (for example, a salt). The conductivity agent will have a non-negligible solubility in the composition. Non-limiting examples of suitable conductivity agents include salts such as, e.g., tetraalkyl ammonium salts (e.g., tetrabutyl ammonium nitrate, tetrabutyl ammonium perchlorate and tetrabutyl ammonium hexafluorophosphate), alkali metal thiocyanates such as potassium thiocyanate and alkali metal perchlorates such as lithium perchlorate. The conductivity agent will be present in a concentration which is sufficient to provide the conductivity which is required or desirable. Of course, mixtures of two or more different conductivity agents (salts) can be used.

If the chiral liquid crystal precursor composition for use in the present invention is to be cured/polymerized by UV radiation the composition will also comprise at least one photoinitiator that shows a non-negligible solubility in the composition. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If the precursor composition is to be cured by a method which is different from irradiation with UV light such as, e.g., by means of high-energy particles (e.g., electron beams), X-rays, gamma-rays, etc. the use of a photoinitiator can, of course, be dispensed with.

The chiral liquid crystal precursor composition for use in the present invention may also comprise a variety of other optional components which are suitable and/or desirable for achieving a particular desired property of the composition and in general, may comprise any components/substances which do not adversely affect a required property of the precursor composition to any significant extent. Non-limiting examples of such optional components are resins, silane compounds, sensitizers for the photoinitiators (if present), etc. For example, the composition may comprise one or more silane compounds which show a non-negligible solubility in the composition. Non-limiting examples of suitable silane compounds include optionally polymerizable silanes such as those of formula $R_1R_2R_3$—Si—$R_4$ wherein $R_1$, $R_2$, and $R_3$ independently represent alkoxy and alkoxyalkoxy having a total of from 1 to about 6 carbon atoms and $R_4$ represents vinyl, allyl, $(C_{1-10})$alkyl, (meth)acryloxy$(C_{1-6})$alkyl, and glycidyloxy$(C_{1-6})$alkyl such as, e.g., vinyltriethoxysilane, vinyltrimethoxysilane, vinyltris(2-methoxyethoxy)silane, 3-methacryloxypropyl-trimethoxysilane, octyltri-ethoxysilane, and 3-glycidyloxypropyl triethoxysilane from the Dynasylan® family supplied by Evonik.

The concentration of the one or more silane compounds, if present, in the precursor composition will usually be from about 0.5% to about 5% by weight, based on the total weight of the composition.

Following the application (e.g., deposition) of the chiral liquid crystal precursor composition according to the invention onto the substrate the precursor composition is brought to a chiral liquid crystal state having specific optical properties. To that end the chiral liquid crystal precursor composition is heated, the solvent contained in the composition, if present, is evaporated and the promotion of the desired chiral liquid crystal state takes place. The temperature used to evaporate the solvent and to promote the formation of the liquid crystal state depends on the components of the chiral liquid crystal precursor composition and will in many cases range from about 55° C. to about 150° C., e.g., from about 55° C. to about 100° C., preferably from about 60° C. to about 100° C. Examples of suitable heating sources include conventional heating means and in particular, radiation sources such as, e.g., an IR lamp. The required heating time depends on several factors such as, e.g., the components of the precursor composition, the type of heating device and the intensity of the heating (energy output of the heating device). In many cases a heating time of from about 1 second to about 30 seconds such as, e.g., not more than about 20 seconds, not more than about 10 seconds, or not more than about 5 seconds will be sufficient.

The term "specific optical properties" is to be understood as a liquid crystal state with a specific pitch that reflects a specific wavelength range. An advantage of the precursor composition which contains a chiral dopant according to formula (I) and related formulae is the ability to generate a stable liquid crystal state quickly after the heating (and evaporation of the solvent). In contrast, the liquid crystal states which are obtained after heating and evaporation of the solvent with precursor compositions of the prior art (see, e.g., EP 1 299 375, EP 1 669 431, and EP 1 339 812, the entire disclosures of which are incorporated by reference herein) very often can easily be disrupted by minor temperature changes. Therefore, to maintain the stability of the liquid crystal state it is necessary in the latter case to freeze or fix the liquid crystal state by means of an at least partial curing or polymerization process. As previously mentioned, when the liquid crystal state is frozen or fixed the creation of a code or a marking inside the marking becomes harder. In contrast, in the process for making a marking according to the present invention no curing/polymerization of components of the precursor composition is carried out prior to stage (iv). In other words, a curing/polymerization process is carried out only after the chiral liquid crystal state of the composition has been locally modified by the modifying agent.

After the application of the chiral liquid crystal precursor composition and the formation of a chiral liquid crystal state (which can be in the form of, e.g., a layer, a pattern or a film) a modifying agent is applied onto one or more regions of the applied composition in the chiral liquid crystal state to locally modify the chiral liquid crystal state. The modifying agent may be applied while the chiral liquid crystal precursor composition is still in a heated state (e.g., immediately following the completion of the heating operation) or may be applied after the chiral liquid crystal precursor composition has cooled down to at least some extent (e.g., is at substantially room temperature). If desired, the cooling of the precursor composition can be accelerated by means known to those of skill in the art such as, e.g., by blowing ambient air onto the previously heated composition. Applying the modifying agent to the precursor composition in a cooled-down state may improve the resolution of the marking. On the other hand, applying the modifying agent immediately after completion of the heating operation may be desirable if the entire process of making the marking is to be conducted in an as simple and speedy as possible manner.

The modifying agent for use in the present invention will not extract any of the compounds which form the chiral liquid crystal state and will also not modify the chemical structure of these compounds to any significant extent (and preferably, not at all). Without wishing to be bound by any theory, it is speculated that the modifying agent will initiate a very localized and controlled reorganization of the liquid crystal state. In this regard, it should be noted that the method of the present invention is fast and easy to implement industrially, and does not require complex means.

In the marking according to the present invention the modifying agent preferably modifies the liquid crystal state from a (predominantly or substantially) anisotropic state which is characterized by specific optical properties to a (predominantly or substantially) isotropic liquid crystal state where the color shifting properties of the liquid crystal state are substantially absent and/or no longer detectable with the unaided eye.

The modifying agent for use in the present invention will usually comprise one or more aprotic organic compounds which are liquid at room temperature and preferably have a relatively high dipole moment and a relatively high dielectric constant. Non-limiting examples thereof include ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted (e.g., alkyl-substituted) nitrobenzene such as, e.g., dimethyl ketone, methyl ethyl ketone, ethyl acetate, dimethyl formamide, dimethyl sulfoxide, nitrobenzene, nitrotoluene, and mixtures of two or more thereof. Preferred compounds for use in the modifying agent of the present invention include acetone, methyl ethyl ketone and ethyl acetate.

The modifying agent is applied to one or more regions of the applied precursor composition in the liquid crystal state having specific optical properties preferably with a printing technique and in particular, a technique selected from continuous ink-jet printing, drop-on-demand ink-jet printing, valve jet printing and spray coating. The advantage, in particular compared to the prior art using lasers or extracting agents on polymerized or partially polymerized liquid crystals is the speed and ease of the formation of the marking, which can be generated in almost real time. Another advantage of using the above printing techniques is the precision and the stability of the marking created inside the chiral liquid crystal state. Another advantage of using this printing technique is the nearly unlimited possibilities of marking which can be created and varied in almost real time. In a preferred embodiment ink-jet techniques are used for applying the modifying agent. The industrial ink-jet printers, commonly used for numbering and coding and marking applications on conditioning lines and printing presses, are particularly suitable. Preferred ink jet printers are single nozzle continuous ink-jet printers (also called raster or multi level deflected printers) and drop-on-demand ink jet printers, in particular valve-jet printers.

In order to enhance the resolution of the applied marking it will often be advantageous if immediately after the application of the modifying agent to one or more regions of the applied precursor composition a stream of air is passed over the surface of the precursor composition, preferably (substantially) parallel thereto. The stream of air can be generated by any means, e.g., with an (industrial) air dryer. The stream of air will preferably not be intense and/or of high speed. The temperature of the air will usually be ambient (e.g., about 20° C.) but may also be somewhat lower or higher, e.g., up to about 60° C., up to about 40° C., or up to about 30° C. The phrase "immediately after the application of the modifying agent" is intended to mean without delay, e.g., within a period of not more than about 10 seconds, for example, not more than about 5 seconds, not more than about 3 seconds, not more than about 2 seconds, or not more than about 1 second following the completion of the application of the modifying agent. Further, it also is possible to (again) heat the precursor composition after the application of the modifying agent (and optionally, the passing of air over the surface of the precursor composition) to further modify the chiral liquid crystal state and/or to remove any residual solvent that was present in the modifying agent. However, in most cases an (additional) heating operation after the application of the modifying agent does not result in any significant additional advantages. If employed, the temperature used for this (optional) heating operation will in many cases range from about 55° C. to about 150° C., e.g., from about 55° C. to about 100° C., or from about 60° C. to about 100° C. Examples of suitable heating sources include conventional heating means and in particular, radiation sources such as, e.g., an IR lamp.

The area of the applied precursor composition over which the modifying agent is applied will usually be from about 0.1% to about 99.9% of the total area of the applied precursor composition. The area will often be at least about 1%, e.g., at least about 5% or at least about 10% and not higher than about 99%, e.g., not higher than about 95% or not higher than about 90% of the total area of the applied precursor composition.

Figure 2:
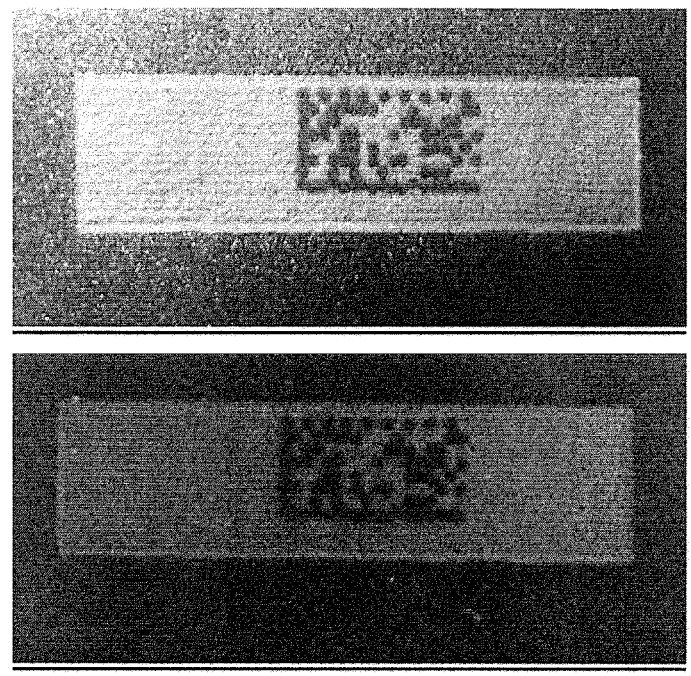
FIG. 2 shows photographs of a marking in accordance with the present invention viewed from two different angles.

The marking according to the present invention may be in the form of an image, a picture, a logo, indicia, and/or a pattern representing a (1D, 2D, 3D) code such as, e.g., a 1-dimensional barcode, a stacked 1-dimensional barcode, a 2-dimensional barcode, a 3-dimensional barcode and/or a data matrix. An example of a corresponding marking is represented by FIG. 2.

It is, of course, possible to use more than one modifying agent (e.g., two, three or more different modifying agents) and to apply them simultaneously and/or successively onto the applied precursor composition (e.g., in different regions of the applied composition). It also is possible, for example, to apply a first modifying agent and to thereafter apply a second modifying agent in at least a part of the region(s) in which the first modifying agent has been applied (and, optionally, also in one or more regions where the first modifying agent has not been applied).

A modifying agent for use in the present invention may further comprise one or more resins to adjust its viscosity. Of course, the resin(s) must be compatible with the application (e.g., printing) technique that is to be employed. Non-limiting examples of resins which may be suitable, depending on the particular circumstances, include polyesters resins such as, e.g, DYNAPOL® L 1203, L 205, L 206, L 208, L 210, L 411, L 651, L658, L 850, L 912, L 952, LH 530, LH 538, LH 727, LH 744, LH 773, LH 775, LH 818, LH 820, LH 822, LH 912, LH 952, LH 530, LH 538, LH 727, LH 744, LH 773, LH 775, LH 818, LH 820, LH 822, LH 823, LH 826, LH 828, LH 830, LH 831, LH 832, LH 833, LH 838, LH898, LH 908, LS436, LS615, P1500, S1218, S1227, S1247, S1249, S1252, S1272, S1401, S1402, S1426, S1450, S1510, S1606, S1611, S243, S320, S341, S361, S394, and S EP1408 from Evonik. Other suitable resins known to those of skill in the art may be used as well. In a preferred embodiment the one or more resins are selected from DYNAPOL® L 1203, L 205, L 206, L 208, L 210, L 411, L 651, L658, L 850, L 912, L 952, LH 530, LH 538, LH 727, LH 744 from Evonik. A typical concentration range for the one or more resins is from about 3% to about 15% by weight, based on the total weight of the modifying agent.

The modifying agent may further comprise one or more conductivity agents such as, e.g., salts which are to impart sufficient conductivity to the modifying agent so as to allow its use in combination with a printer such as, e.g., a continuous ink-jet printer. Examples of suitable conductivity agents include those which are set forth above as examples of conductivity agents for use in the precursor composition of the present invention such as, e.g., tetrabutyl ammonium nitrate, tetrabutyl ammonium perchlorate, tetrabutyl ammonium hexafluorophosphate, potassium thiocyanate, lithium perchlorate and other conductivity agents known in the art.

In order to strengthen the security of the marking according to the present invention the modifying agent may further comprise one or more pigments and/or dyes which absorb in the visible or invisible region of the electromagnetic spectrum and/or one or more pigments and/or dyes which are luminescent. Non-limiting examples of suitable pigments and/or dyes which absorb in the visible or invisible region of the electromagnetic spectrum include phthalocyanine derivatives. Non-limiting examples of suitable luminescent pigments and/or dyes include lanthanide derivatives. The presence of pigment(s) and/or dye(s) will enhance and reinforce the security of the marking against counterfeiting. Of course, in addition to the components discussed above the modifying agent for use in the present invention may comprise any other components/substances which do not adversely affect the required properties of the modifying agent to any significant extent.

The marking according to the present invention is finally obtained by curing and/or polymerizing the (entire) composition in the chiral liquid crystal state that has been locally modified (in one or more region(s)) by the application of the modifying agent(s). The fixing or hardening is preferably performed by irradiation with UV-light, which induces polymerization of the polymerizable groups present in the precursor composition. Contrary to the prior art set forth above, the marking according to the invention is easy to implement industrially, and reliable.

Another advantage of the marking according to the present invention is that the natural random variations inherently present in the printing process according to the present invention can be used as a unique identifier ("fingerprint") which is virtually impossible to reproduce. In this regard, it is to be appreciated that even without the application of a modifying agent the cured and/or polymerized precursor composition in the chiral liquid crystal state is a marking. In other words, the modifying agent serves to generate a "marking within/on a marking".

The marking according to the present invention can be incorporated, for example, in a security feature, an authenticity feature, an identification feature or a tracking and tracing feature. An example of a security feature is an overt feature with a 3D effect.

The following examples are intended to illustrate the invention without restricting it.

EXAMPLE

A marking according to the present invention is prepared as follows:
(1) Preparation of Chiral Liquid Crystal Precursor Compositions A chiral liquid crystal precursor composition (1) was prepared as follows: A chiral dopant compound B of formula (I) shown above, i.e., (3R,3aR,6R,6aR)-hexahydrofuro[3,2-b]furan-3,6-diyl bis(4-(4-(acryloyloxy)-3-methoxybenzoyloxy)-3-methoxy-benzoate) (7.5 g), a nematic compound A1, i.e., benzoic acid, 4-[[[4-[(1-oxo-2-propen-1-yl)oxy]butoxy]carbonyl]oxy]-1,1'-(2-methyl-1,4-phenylene) ester (22.0 g), a nematic compound A2, i.e., 2-methyl-1,4-phenylene bis(4-(4-(acryloyloxy)butoxy)-benzoate) (14.0 g), and acetone (49.9 g) were weighed into a screwable flask which was thereafter heated in an oven until obtaining a brownish solution. To the mixture were then added tetrabutylammonium perchlorate (0.6 g), lithium perchlorate (0.3 g), 2-methyl-1[4-(methylthio)phenyl]-2-morpholinopropan-1-one (Irgacure 907® from Ciba, 1.3 g), 2,4-diethyl-thioxanthen-9-one (0.7 g), and vinyltriethoxysilane (3.7 g). The final mixture was then stirred or shaken until complete dissolution was achieved to result in the chiral liquid crystal precursor composition (1).

A chiral liquid crystal precursor composition (2) was prepared as follows: A chiral dopant compound B of formula (I) shown above, i.e., (3R,3aR,6R,6aR)-6-(4-(4-(acryloyloxy)-3-methoxybenzoyloxy)-3-methoxybenzoyloxy)hexahydrofuro[3,2-b]furan-3-yl 4-(4-(acryloyloxy)benzoyloxy)-3- methoxybenzoate (9.0 g), a nematic compound A1, i.e., benzoic acid, 4-[[[4-[(1-oxo-2-propen-1-yl)oxy]butoxy]carbonyl]oxy]-1,1'-(2-methyl-1,4-phenylene) ester (16.0 g), a nematic compound A2, i.e., 2-methyl-1,4-phenylene bis(4-(4-(acryloyloxy)butoxy)-benzoate) (20.0 g), and methyl ethyl ketone (48.0 g) were weighed into a screwable flask which was thereafter heated in an oven until obtaining a brownish solution. To the mixture were then added tetrabutylammonium perchlorate (0.5 g), lithium perchlorate (0.6 g), 2-methyl-1-[4-(methylthio)phenyl]-2-morpholinopropan-1-one (Irgacure 907® from Ciba, 1.2 g), 2-isopropyl-thioxanthen-9-one (0.7 g), and vinyltriethoxysilane (4.0 g). The final mixture was then stirred or shaken until complete dissolution was achieved to result in the chiral liquid crystal precursor composition (2).

(2) Deposition of the Chiral Liquid Crystal Precursor Composition on a Substrate The chiral liquid crystal precursor composition (1) or (2) was then used to print a plain pattern by continuous ink jet printing on a paper substrate with a dark background.

(3) Bringing the Precursor Composition to the Chiral Liquid Crystal State

The chiral liquid crystal state was developed from the plain pattern by exposure to an IR lamp for about 1 to 5 seconds (depending on the substrate).

(4) Application of a Modifying Agent to One or More Regions of the Deposited Composition in the Liquid Crystal State A modifying agent was then printed on top of the developed pattern of step (3) in the form of a marking or design, using a continuous ink-jet printer, which resulted locally in a substantially isotropic state. Within about 1 second following the completion of the printing process an air flow was streamed parallel to the printed surface. The modifying agent used was a solution (in droplet form) of a resin (5 to 15% by weight) and of lithium perchlorate (0.6% by weight) in acetone or methyl ethyl ketone.

(5) Curing or Polymerizing the Resulting Product

The resultant product with the marking printed thereon was then cured by a UV dryer with a mercury low-pressure lamp having a UV irradiance of 10 mW/cm².

An example of a product with marking obtained by the above procedure is shown in FIG. 2.

The following other compounds may, for example, be employed in the above-described procedure instead of the chiral dopant compound B of formula (I):

(3R,3aR,6R,6aR)-hexahydrofuro[3,2-b]furan-3,6-diyl bis(4-(4(acryloyloxy)benzoyloxy)-benzoate);
(3R,3aR,6R,6aR)-hexahydrofuro[3,2-b]furan-3,6-diyl bis(4-(4-(acryloyloxy)butoxy)-benzoate);
(3R,3aR,6R,6aR)-hexahydrofuro[3,2-b]furan-3,6-diyl bis(4-(acryloyloxy)-2-methyl-benzoate);
(3R,3aR,6S,6aR)-hexahydrofuro[3,2-b]furan-3,6-diyl bis(4-(4-(acryloyloxy)benzoyloxy)-3-methoxybenzoate);
(3R,3aR,6R,6aR)-hexahydrofuro[3,2-b]furan-3,6-diyl bis(4-(4-(acryloyloxy)-3-methoxy-benzoyloxy)benzoate);
(3R,3aR,6R,6aR)-hexahydrofuro[3,2-b]furan-3,6-diyl bis(4-(4(acryloyloxy)benzoyloxy)-3-methoxybenzoate);
2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol;
2,5-bis-O-(4-{[4-(acryloyloxy)benzoyl]oxy}-2-methoxybenzoyl)-1,4:3,6-dianhydro-D-mannitol;
2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;
2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol;
2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;
2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;
2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;
2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol;
2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol;
2,5-bis-O-(4-{[4-(acryloyloxy)benzoyl]oxy}-3-methoxybenzoyl)-1,4:3,6-dianhydro-D-mannitol;
2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-mannitol;
2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol;
2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-mannitol;
2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol;
2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol;
2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol;
2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol;
2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol;
2,5-bis-O-(4-{[4-(acryloyloxy)-2,5-dimethylbenzoyl]oxy}-2-ethoxybenzoyl)-1,4:3,6-dianhydro-D-mannitol;
2,5-bis-O-(4-{[4-(acryloyloxy)-2-ethoxybenzoyl]oxy}-2-ethoxybenzoyl)-1,4:3,6-dianhydro-D-mannitol;
2,5-bis-O-(4-{[4-(acryloyloxy)-2-methoxybenzoyl]oxy}-2-ethoxybenzoyl)-1,4:3,6-dianhydro-D-mannitol;
2,5-bis-O-(4-{[4-(acryloyloxy)-2-ethoxybenzoyl]oxy}-2-methoxybenzoyl)-1,4:3,6-dianhydro-D-mannitol;
2,5-bis-O-(4-{[4-(acryloyloxy)-2-ethoxybenzoyl]oxy}-3-methylbenzoyl)-1,4:3,6-dianhydro-D-mannitol.

2,5-bis-O-(4-{[4-(acryloyloxy)-2-ethoxybenzoyl]oxy}-3-methoxybenzoyl)-1,4:3,6-dianhydro-D-mannitol;
2,5-bis-O-(4-{[4-(acryloyloxy)-3-methoxybenzoyl]oxy}-3-methoxybenzoyl)-1,4:3,6-dianhydro-D-mannitol;
2,5-bis-O-(4-{[4-(acryloyloxy)-3-methoxybenzoyl]oxy}-3-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol;
2,5-bis-O-(4-{[4-(acryloyloxy)benzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol;
2-O-(4-[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;
2,5-bis-O-(4-{[4-(acryloyloxy)benzoyl]oxy}-3-methoxybenzoyl)-1,4:3,6-dianhydro-D-glucitol;
2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol;
2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol;
2-O-(4-{[4-(acryloyloxy)-2-methoxybenzoyl]oxy}-2,5-dimethylbenzoyl)-5-O-(4-{[4-(acryloyloxy)-3-methoxybenzoyl]oxy}-3-methylbenzoyl)-1,4:3,6-dianhydro-D-glucitol;
2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol;
2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-glucitol;
2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol;
2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol;
2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol
2-O-(4-{[4-(acryloyloxy)-3-ethoxybenzoyl]oxy}benzoyl)-5-O-(4-{[4-(acryloyloxy)-2-methoxybenzoyl]oxy}-2-ethoxybenzoyl)-1,4:3,6-dianhydro-D-glucitol;
2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol
2,5-bis-O-(4-{[4-(acryloyloxy)-2,5-dimethylbenzoyl]oxy}-2-ethoxybenzoyl)-1,4:3,6-dianhydro-D-glucitol;
2,5-bis-O-(4-{[4-(acryloyloxy)-2-ethoxybenzoyl]oxy}-2-ethoxybenzoyl)-1,4:3,6-dianhydro-D-glucitol;
2,5-bis-O-(4-{[4-(acryloyloxy)-2-methoxybenzoyl]oxy}-2-ethoxybenzoyl)-1,4:3,6-dianhydro-D-glucitol;
2,5-bis-O-(4-{[4-(acryloyloxy)-2-ethoxybenzoyl]oxy}-2-methoxybenzoyl)-1,4:3,6-dianhydro-D-glucitol;
2,5-bis-O-(4-{[4-(acryloyloxy)-2-ethoxybenzoyl]oxy}-3-methylbenzoyl)-1,4:3,6-dianhydro-D-glucitol; and
2,5-bis-O-(4-{[4-(acryloyloxy)-2-ethoxybenzoyl]oxy}-3-methoxybenzoyl)-1,4:3,6-dianhydro-D-glucitol.

As nematic compound A1 in the above-described procedure the following other compounds may, for example, be employed:

2-methoxybenzene-1,4-diyl bis[4-({[4-(acryloyloxy)butoxy]carbonyl}oxy)benzoate];
4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate;
2-methoxybenzene-1,4-diyl bis[4-({[4-(acryloyloxy)butoxy]carbonyl}oxy)-2-methyl-benzoate];
2-methylbenzene-1,4-diyl bis[4-({[4-(acryloyloxy)butoxy]carbonyl}oxy)-2-methyl-benzoate];
4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate;
2-methylbenzene-1,4-diyl bis[4-({[4-(acryloyloxy)butoxy]carbonyl}oxy)benzoate];
2-methylbenzene-1,4-diyl bis[4-({[4-(acryloyloxy)butoxy]carbonyl}oxy)-3-methoxy-benzoate];
4-{[4-({[4-(acryloyloxy)butoxy]carbonyl}oxy)-3-methoxybenzoyl]oxy}-2-methylphenyl 4-({[4-(acryloyloxy)butoxy]carbonyl}oxy)-3,5-dimethoxybenzoate;
2-methylbenzene-1,4-diyl bis[4-({[4-(acryloyloxy)butoxy]carbonyl}oxy)-3,5-dimethoxy-benzoate];
2-methoxybenzene-1,4-diyl bis[4-({[4-(acryloyloxy)butoxy]carbonyl}oxy)-3,5-di-methoxybenzoate]; and
4-{[4-({[4-(acryloyloxy)butoxy]carbonyl}oxy)-3-methoxybenzoyl]oxy}-2-methoxyphenyl 4-({[4-(acryloyloxy)butoxy]carbonyl}oxy)-3,5-dimethoxybenzoate.

As nematic compound A2 in the above-described procedure the following other compounds may, for example, be employed:

4-({4-[4-(acryloyloxy)butoxy]benzoyl}oxy)-3-methylphenyl 4-[4-(acryloyloxy)butoxy]-2-methylbenzoate;
4-({4-[4-(acryloyloxy)butoxy]benzoyl}oxy)-3-methylphenyl 4-[4-(acryloyloxy)butoxy]-3-methylbenzoate;
2-methylbenzene-1,4-diyl bis{4-[4-(acryloyloxy)butoxy]-2-methylbenzoate};
4-({4-[4-(acryloyloxy)butoxy]-2-methylbenzoyl}oxy)-3-methylphenyl 4-[4-(acryloyl-oxy)butoxy]-2,5-dimethylbenzoate;
2-methylbenzene-1,4-diyl bis{4-[4-(acryloyloxy)butoxy]-2,5-dimethylbenzoate} 2-methylbenzene-1,4-diyl bis{4-[4-(acryloyloxy)butoxy]benzoate};
4-({4-[4-(acryloyloxy)butoxy]-3,5-dimethylbenzoyl}oxy)-3-methylphenyl 4-[4-(acryloyloxy)butoxy]-2,5-dimethylbenzoate;
2-methylbenzene-1,4-diyl bis{4-[4-(acryloyloxy)butoxy]-3,5-dimethylbenzoate};
2-methoxybenzene-1,4-diyl bis{4-[4-(acryloyloxy)butoxy]-3,5-dimethylbenzoate};

4-({4-[4-(acryloyloxy)butoxy]-3-methylbenzoyl}oxy)-2-methoxyphenyl 4-[4-(acryloyl-oxy)butoxy]-3,5-dimethylbenzoate;

2-methoxybenzene-1,4-diyl bis{4-[4-(acryloyloxy)butoxy]-3-methylbenzoate};

4-({4-[4-(acryloyloxy)butoxy]benzoyl}oxy)-3-methoxyphenyl 4-[4-(acryloyloxy)-butoxy]-3-methylbenzoate;

4-({4-[4-(acryloyloxy)butoxy]benzoyl}oxy)-3-methoxyphenyl 4-[4-(acryloyloxy)-butoxy]-2,5-dimethylbenzoate;

2-methoxybenzene-1,4-diyl bis{4-[4-(acryloyloxy)butoxy]-2-methoxybenzoate};

2-methoxybenzene-1,4-diyl bis{4-[4-(acryloyloxy)butoxy]-3,5-dimethoxybenzoate};

2-methoxybenzene-1,4-diyl bis{4-[4-(acryloyloxy)butoxy]-3-methoxybenzoate};

2-ethoxybenzene-1,4-diyl bis{4-[4-(acryloyloxy)butoxy]benzoate};

2-ethoxybenzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]benzoate};

4-({4-[4-(acryloyloxy)butoxy]benzoyl}oxy)-2-(propan-2-yloxy)phenyl 4-[4-(acryloyl-oxy)butoxy]-2-methylbenzoate;

2-(propan-2-yloxy)benzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]-2,5-dimethyl-benzoate};

2-(propan-2-yloxy)benzene-1,4-diyl bis{4-[4-(acryloyloxy)butoxy]-3,5-dimethyl-benzoate}; and 2-(propan-2-yloxy)benzene-1,4-diyl bis{4-[4-(acryloyloxy)butoxy]-3,5-dimethoxy-benzoate}.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The entire disclosures of concurrently filed U.S. patent applications entitled "CHIRAL LIQUID CRYSTAL POLYMER MARKING" application Ser. No. 12/783,078, "MARKING BASED ON MODIFIED CHIRAL LIQUID CRYSTAL POLYMERS" application Ser. No. 12/783,081, and "MODIFIED MARKING BASED ON CHIRAL LIQUID CRYSTAL POLYMERS" application Ser. No. 12/783,088 are expressly incorporated by reference herein.

What is claimed is:

1. A liquid crystal polymer marking, wherein the marking is obtained by a process comprising:
   (i) applying a chiral liquid crystal precursor composition onto a substrate;
   (ii) heating the applied chiral liquid crystal precursor composition to bring same to a chiral liquid crystal state;
   (iii) applying to at least one area of the applied composition at a first chiral liquid crystal state at least one modifying agent to modify the chiral liquid crystal state locally in the at least one area, the at least one area being less than a total surface area of the applied composition at a first chiral liquid crystal state; and
   (iv) at least one of curing and polymerizing the locally modified chiral liquid crystal state composition, and no curing or polymerization of components is carried out prior to the at least one of curing and polymerizing the locally modified chiral liquid crystal state composition.

2. The marking of claim 1, wherein the at least one modifying agent modifies the chiral liquid crystal state to at least partially result in an isotropic state.

3. The marking of claim 1, wherein the chiral liquid crystal precursor composition comprises (i) one or more nematic compounds A and (ii) one or more chiral dopant compounds B which are capable of giving rise to a cholesteric state of the chiral liquid crystal precursor composition.

4. The marking of claim 3, wherein the chiral liquid crystal precursor composition comprises at least two compounds A.

5. The marking of claim 3, wherein the one or more nematic compounds A as well as the one or more chiral dopant compounds B comprise at least one compound that comprises at least one polymerizable group.

6. The marking of claim 5, wherein the at least one polymerizable group comprises an unsaturated carbon-carbon bond.

7. The marking of claim 6, wherein the at least one polymerizable group comprises a group of formula $H_2C=CH-C(O)-$.

8. The marking of claim 3, wherein all of the one or more nematic compounds A and all of the one or more chiral dopant compounds B comprise at least one polymerizable group.

9. The marking of claim 3, wherein the chiral liquid crystal precursor composition comprises at least one chiral dopant compound B of formula (I):

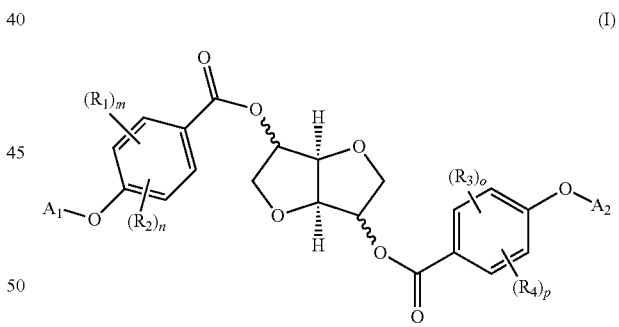

(I)

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (I) to (iii):

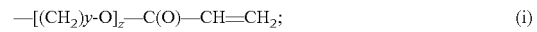
$-[(CH_2)_y-O]_z-C(O)-CH=CH_2;$  (i)

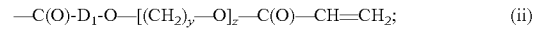
$-C(O)-D_1-O-[(CH_2)_y-O]_z-C(O)-CH=CH_2;$  (ii)

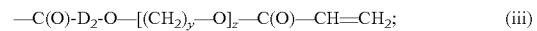
$-C(O)-D_2-O-[(CH_2)_y-O]_z-C(O)-CH=CH_2;$  (iii)

$D_1$ denotes a group of formula

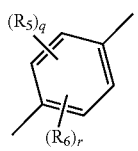

$D_2$ denotes a group of formula

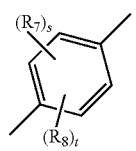

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

10. The marking of claim 1, wherein the at least one modifying agent comprises at least one compound selected from ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted nitrobenzene.

11. The marking of claim 10, wherein the at least one modifying agent comprises at least one of dimethyl ketone, methyl ethyl ketone, ethyl acetate, dimethyl formamide, dimethyl sulfoxide, and nitrobenzene.

12. The marking of claim 10, wherein the at least one modifying agent further comprises at least one resin.

13. The marking of claim 10, wherein the at least one modifying agent further comprises at least one salt.

14. The marking of claim 10, wherein the at least one modifying agent further comprises at least one of a pigment and a dye that absorbs in the visible or invisible region of the electromagnetic spectrum.

15. The marking of claim 10, wherein the at least one modifying agent further comprises at least one of a luminescent pigment and a luminescent dye.

16. The marking of claim 1, wherein (ii) comprises heating the applied composition to a temperature of from about 55° C. to about 150° C.

17. The marking of claim 1, wherein (iii) comprises applying the at least one modifying agent by at least one of continuous ink-jet printing, drop-on-demand ink-jet printing, spray coating, and valve-jet printing.

18. The marking of claim 1, wherein immediately after (iii) a stream of air is passed over the at least one area.

19. The marking of claim 1, wherein the marking is in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

20. A substrate which comprises the marking of claim 1.

21. The substrate of claim 20, wherein the marking serves the function of at least one of a security element, an authenticity element, an identification element, and a tracking and tracing element.

22. The substrate of claim 20, wherein the substrate is or comprises at least one of an identity document, a label, a packaging, a banknote, a security document, a passport, a stamp, an ink-transfer film, and a reflective film.

23. A method of providing a substrate with a liquid crystal polymer marking, wherein the method comprises:
(i) applying a chiral liquid crystal precursor composition onto a substrate;
(ii) heating the applied chiral liquid crystal precursor composition to bring same to a chiral liquid crystal state;
(iii) applying to at least one area of the applied composition at a first chiral liquid crystal state at least one modifying agent to modify the chiral liquid crystal state locally in the at least one area, the at least one area being less than a total surface area of the applied composition at a first chiral liquid crystal state;
(iv) at least one of curing and polymerizing the locally modified chiral liquid crystal state composition to convert the composition in the locally modified chiral liquid crystal state into a liquid crystal polymer marking, and no curing or polymerization of components is carried out prior to the at least one of curing and polymerizing the locally modified chiral liquid crystal state composition.

24. A substrate having a marking thereon, wherein the marking comprises a layer or film of a chiral liquid crystal polymer, the layer or film comprising in at least one area thereof, the at least one area being less than a total surface area of the layer or film, a liquid crystal polymer that has at least one optical property which is different from an optical property of a remainder of the layer or film.

25. The substrate of claim 24, wherein the liquid crystal polymer in the at least one area of the layer or film comprises an isotropic state.

26. The marking according to claim 1, wherein the one or more areas is less than about 99% of the total surface area of the applied composition at a first chiral liquid crystal state.

27. The marking according to claim 26, wherein the one or more areas is less than about 90% of the total surface area of the applied composition at a first chiral liquid crystal state.

28. The marking according to claim 27, wherein the one or more areas is at least about 5% of the total surface area of the applied composition at a first chiral liquid crystal state.

29. The marking according to claim 28, wherein the one or more areas is at least about 10% of the total surface area of the applied composition at a first chiral liquid crystal state.

30. The method according to claim 23, wherein the one or more areas is less than about 99% of the total surface area of the applied composition at a first chiral liquid crystal state.

31. The method according to claim 30, wherein the one or more areas is less than about 90% of the total surface area of the applied composition at a first chiral liquid crystal state.

32. The method according to claim 31, wherein the one or more areas is at least about 5% of the total surface area of the applied composition at a first chiral liquid crystal state.

33. The method according to claim 32, wherein the one or more areas is at least about 10% of the total surface area of the applied composition at a first chiral liquid crystal state.

34. The marking according to claim 1, wherein the modifying composition does not extract any of compounds which form the chiral liquid crystal state.

35. The method according to claim 23, wherein the modifying composition does not extract any of compounds which form the chiral liquid crystal state.

36. A liquid crystal polymer marking, wherein the marking is obtained by a process comprising:
(i) applying a chiral liquid crystal precursor composition onto a substrate;
(ii) heating the applied chiral liquid crystal precursor composition to bring same to a chiral liquid crystal state;

(iii) applying to at least one area of the applied composition at a first chiral liquid crystal state at least one modifying agent to modify the chiral liquid crystal state locally in the at least one area, the at least one area being less than a total surface area of the applied composition at a first chiral liquid crystal state; and (iv) at least one of curing and polymerizing the locally modified chiral liquid crystal state composition; and wherein the marking is in a form of at least one of an image, a picture, a logo, indicia, and a pattern representing a code selected from one or more of a 1-dimensional barcode, a stacked 1-dimensional barcode, a 2-dimensional barcode, a 3-dimensional barcode, and a data matrix.

* * * * *

UNITED STATES PATENT AND TRADEMARK OFFICE
CERTIFICATE OF CORRECTION

PATENT NO. : 8,426,011 B2  
APPLICATION NO. : 12/783068  
DATED : April 23, 2013  
INVENTOR(S) : Thomas Tiller et al.

It is certified that error appears in the above-identified patent and that said Letters Patent is hereby corrected as shown below:

On the Title Page, at Item (73) Assignee, of the printed patent, "SICPA Holding SA" should be --SICPA HOLDING SA--.

Signed and Sealed this  
Sixteenth Day of July, 2013

Teresa Stanek Rea  
*Acting Director of the United States Patent and Trademark Office*